United States Patent [19]

Burgess et al.

[11] 3,744,120

[45] July 10, 1973

[54] DIRECT BONDING OF METALS WITH A METAL-GAS EUTECTIC

[75] Inventors: James F. Burgess; Constantine A. Neugebauer, both of Schenectady, N.Y.

[73] Assignee: General Electric Company, Schenectady, N.Y.

[22] Filed: Apr. 20, 1972

[21] Appl. No.: 245,890

[52] U.S. Cl. .................................. 29/494, 148/6.31

[51] Int. Cl. ........................ B23k 31/02, B23k 35/38

[58] Field of Search ...................... 29/494; 148/6.31; 117/107.2

[56] References Cited

UNITED STATES PATENTS

| | | | |
|---|---|---|---|
| 2,351,798 | 6/1944 | Alexander | 29/494 UX |
| 2,491,284 | 12/1949 | Sears | 29/494 UX |
| 2,898,230 | 8/1959 | Bulloff | 117/107.2 X |
| 3,069,765 | 12/1962 | Simpelaar | 29/494 X |
| 3,114,970 | 12/1963 | Whitocre | 117/107.2 R X |
| 3,321,828 | 5/1967 | Miller | 29/494 X |
| 3,667,110 | 6/1972 | Gwyn, Jr. | 29/494 |
| 3,673,678 | 7/1972 | Moreau et al. | 29/494 |
| 3,686,746 | 8/1972 | Gwyn, Jr. | 29/494 X |

OTHER PUBLICATIONS

Wilson, R. W., "Chemical Vapor Deposition Welding Below the Recrystallization Temperatures," Welding Journal Research Supplement, August, 1968, pp. 345–s to 354–s.

*Primary Examiner*—J. Spencer Overholser
*Assistant Examiner*—Ronald J. Shore
*Attorney*—James F. Ahern et al.

[57] ABSTRACT

A method is described for direct bonding of metallic members to other metallic members with a metal-gas eutectic. The method comprises placing a metal member such as copper, for example, in contact with another metal member, such as nickel, for example, heating the metal members to a temperature slightly below the melting point of the lower melting point metal, e.g., approximately 1,072°C. for copper, the heating being performed in a reactive atmosphere, such as an oxidizing atmosphere, for a sufficient time to create a metal-gas eutectic melt which, upon cooling, bonds the metal members together. Various metals and reactive gases are described for direct bonding.

6 Claims, 3 Drawing Figures

DIRECT BONDING OF METALS WITH A METAL-GAS EUTECTIC

The present invention relates to improved bonds and methods of directly bonding two or more metallic members together. This application relates to our concurrently filed application Ser. No. 245,889 of common assignee. The entire disclosure of which is incorporated herein by reference thereto.

The formation of bonds between metallic members is achieved in various ways. For example, certain metals can be bonded together with the use of solders. Other metals are bonded together by welds, such as arc welds or spot welds. Where certain metals can not be directly bonded to each other, generally intermediate metallic members are used to form the bond. The need for simple methods of forming bonds between similar and dissimilar metals still exists. For example, in the fabrication of semiconductor integrated circuits, tenacious bonds between various metals are required. In addition, it is desirable to provide low ohmic contact between such metals. The foregoing methods are frequently not compatible with integrated circuit fabrication and even if compatible are frequently economically unacceptable. Accordingly, a need for a simple and economically acceptable method of forming bonds between metallic members is still desired.

It is therefore an object of this invention to provide a method of forming bonds between metallic members with a metal-gas eutectic composition.

It is yet another object of this invention to provide a method of bonding metallic members together without the use of intermediate metal layers.

Another object of this invention is to provide a method of bonding metallic members together in a simple heating step without the need for intermediate flux.

Yet another object of this invention is to provide a tenacious bond and a method of forming this bond between metallic members which bond exhibits low ohmic resistance and is compatible with the fabrication of semiconductor integrated circuit modules.

Briefly, our invention relates to bonds and methods of bonding together metallic members by placing at least two metallic members in contact with each other and elevating the temperature of the members in a reactive atmosphere of selected gases and at controlled partial pressures for a sufficient time to produce a metal-gas eutectic composition on the surface of at least one of the metallic members. This eutectic composition or melt forms at a temperature below the melting point of one of the metallic members and wets both metallic members so that upon cooling, a tenacious bond is formed between the metallic members. By way of example, useful metallic materials include copper, nickel, cobalt, chromium, iron, silver, aluminum, alloys thereof, and stainless steel. Useful reactive gases include oxygen-bearing gases, phosphorus-bearing gases and sulfur-bearing gases, for example. In general, the amount of reactive gas necessary to produce tenacious bonds is dependent, in part, upon the thickness of the metallic members and the times and temperatures required to form the eutectic melt.

Other objects and advantages of our invention will become more apparent to those skilled in the art from the following detailed description taken in connection with the accompanying drawings in which.

Figure 1:
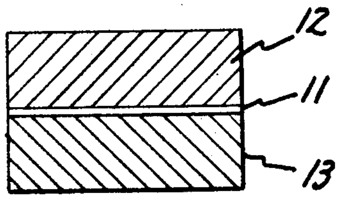
FIG. 1 illustrates a typical bond between two metallic members formed in accord with our invention.

FIG. 1 illustrates, by way of example, a typical bond 11 between metallic members 12 and 13. The bond 11 comprises a eutectic composition formed with at least one of the metallic members and a reactive gas in accord with the novel aspects of our invention.

As used herein, the term metallic member or material is intended to include such materials as copper, nickel, iron, cobalt, chromium, silver, aluminum, alloys of the aforementioned elemental materials, and stainless steel. As will become more apparent from the following description, still other metallic materials, such as beryllium-copper, for example, may also be advantageously employed, if desired.

The term eutectic or metal-gas eutectic composition as used herein means a mixture of atoms of the metallic member and the reactive gas or compound formed between the metal and the reactive gas; but does not include eutectics formed by the reaction or mixing of two metals rather than a reaction between a metal and a component of a gas. For example, where the metallic member is copper and the reactive gas is oxygen, the metal-gas eutectic is a mixture of copper and copper oxide. Where the metal is nickel and the reactive gas is phosphorus, the eutectic is a mixture of nickel and nickel phosphide. Still further, where the metallic member is cobalt and the reactive gas is a sulfur-bearing gas, the eutectic is formed between cobalt and cobalt sulfide.

Figure 2:
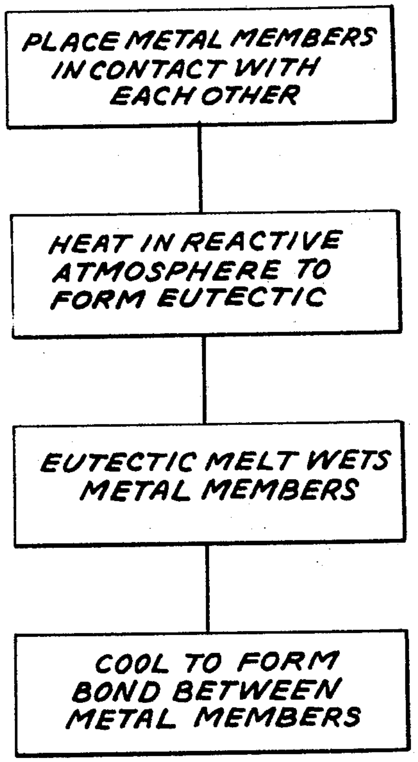
FIG. 2 is a flow diagram illustrating the process steps for forming tenacious metal-to-metal bonds in accord with our invention.

The novel process for making tenacious bonds between metallic members 12 and 13 is illustrated in the flow chart of FIG. 2. More specifically, FIG. 2 illustrates the practice of our invention by placing two metallic members in contact with each other, such as one member overlying another. These members are then placed in a suitable furnace, such as is described below, which includes a reactive atmosphere such that upon heating of the metallic members, a metal-gas eutectic composition forms. The temperature at which the desired eutectic composition forms and the partial pressure of the reactive gas necessary to form the desired eutectic composition depend upon the selected metallic members and the reactive gas. In general, however, the partial pressure of the reactive gas must exceed the equilibrium partial pressure of the reactive gas in the metal at or above the eutectic temperature. For example, when bonding copper members together, a reactive atmosphere including oxygen, for example, requires a partial pressure of oxygen in excess of $1.5 \times 10^{-6}$ atmospheres at the eutectic temperature of 1,065°C. Other metallic materials and other reactive gases require different partial pressures and different temperatures to form the desired eutectic.

Table I is a representative listing of typical eutectic compositions which are useful in practicing our invention. These eutectics are formed by reacting the metallic members to be bonded with a reactive gas controllably introduced into an oven or furnace.

TABLE I

| Metal-Gas | Eutectic | Per Cent by Weight of Reactive Gas |
| --- | --- | --- |

| Eutectic | Temp. °C. | at Eutectic Composition |
|---|---|---|
| Iron-Oxygen | 1523° | 0.16 $O_2$ |
| Copper-Oxygen | 1065° | 0.39 $O_2$ |
| Chromium-Oxygen | 1800° | 0.6 $O_2$ |
| Chromium-Sulfur | 1550° | 2.2 S |
| Copper-Phosphorus | 714° | 8.4 P |
| Nickel-Oxygen | 1438° | 0.24 $O_2$ |
| Nickel-Phosphorus | 880° | 11.0 P |
| Molybdenum-Silicon | 2070° | 5.5 Si |
| Silver-Sulfur | 906° | 1.8 S |
| Silver-Phosphorus | 878° | 1.0 P |
| Copper-Sulfur | 1067° | 0.77 S |
| Cobalt-Oxygen | 1451° | 0.23 $O_2$ |
| Aluminum-Silicon | 577° | 11.7 Si |

The eutectics listed in Table I are formed by reacting the metallic members in an oxygen-bearing gas, such as oxygen, a sulfur-bearing gas, such as hydrogen sulfide, a phosphorus-bearing gas, such as phosphine, or a silicon-bearing gas, such as silane. At the eutectic temperature of the selected metallic member and the reactive gas, such as those temperatures listed in Table I, the eutectic composition becomes a liquid and wets the adjoining member so that upon cooling, the metallic members become tenaciously bonded together.

Table II illustrates, by way of example, typical metal-to-metal bonds formed in accord with our invention and the conditions under which the bonds are formed. For these conditions, the reactive gas is oxygen.

TABLE II

| Metals | Thickness | Temp. °C | Time at Elevated Temperature |
|---|---|---|---|
| Cu - Cu | 5 mils | 1072°C | 0.5 hrs. |
| Cu - Ni | 5 mils | 1072°C | 1.0 hrs. |
| Cu-Stainless Steel | 5 mils | 1072°C | 1.0 hrs. |
| Ni - Ni | 10 mils | 1445°C | 1.0 hrs. |
| Fe - Fe | 10 mils | 1530°C | 1.0 hrs. |
| Co - Co | 15 mils | 1458°C | 1.0 hrs. |
| Cr - Cr | 15 mils | 1557°C | 1.5 hrs. |

The examples of metal-to-metal bonding illustrated in Table II are by way of example, and not by way of limitation. In general, most metals which form a metal-gas eutectic in a reactive atmosphere are useful in forming metal-to-metal bonds. The bonding can be between like metals, dissimilar metals, or even alloys. For example, where like metals are bonded together, the eutectic forms on both surfaces of the members. Where dissimilar metals are bonded together, the eutectic generally forms on at least one surface of the metal having the lower eutectic-forming temperature. For example, as in the case of copper-nickel, the eutectic forms with the copper. The eutectic then wets both metal surfaces thereby forming the desired bond. Where alloys are employed, such as the various alloys of nickel, iron, cobalt, copper, silver, chromium and aluminum are employed, the eutectic composition is believed to form with one of the elemental metals, generally the one with the lower melting point.

One factor which appears to affect the tenacity and uniformity of metal-to-metal bonds formed in accord with our invention is the relationship between the melting point of the metallic member and the eutectic temperature. Where the eutectic temperature is within approximately 30° to 50°C. of the melting point of the metallic member, for example, the metallic member tends to plastically conform to the shape of the other member and thereby produce better bonds than those eutectics which become liquids at temperatures greater than approximately 50°C. below the melting point of the metallic member. The uniformity of the bond therefore appears to be related to the "creep" of the metal which becomes considerable only near the melting point. From Table I, for example, it can be seen that the following eutectics meet this requirement: copper-copper oxide, nickel-nickel oxide, cobalt-cobalt oxide, iron-iron oxide and copper-copper sulfide.

Having thus described some useful embodiments of our invention and the methods of forming metal-to-metal bonds, apparatus useful in practicing our invention along with more specific details of the process will now be described with reference to FIG. 3.

Figure 3:
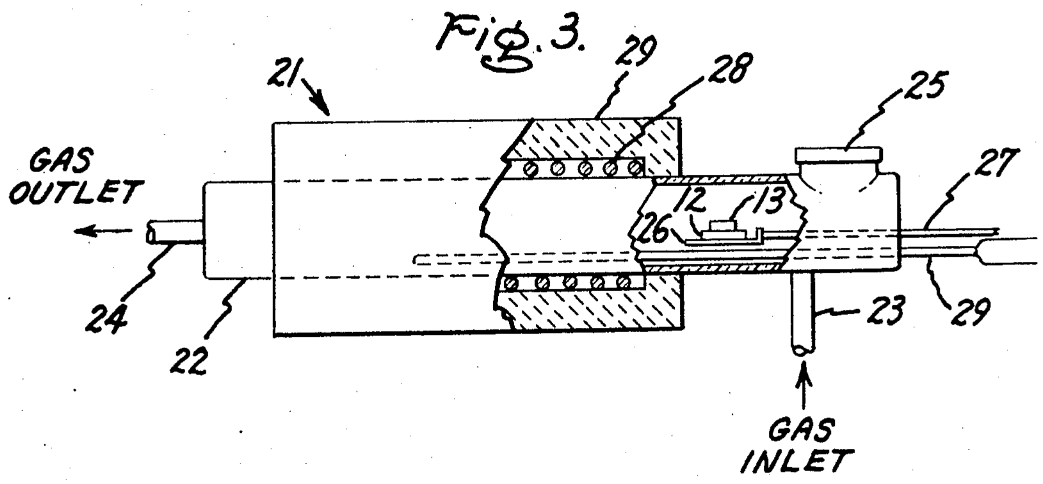
FIG. 3 schematically illustrates a horizontal furnace useful in practicing our invention.

FIG. 3 illustrates a horizontal furnace comprising an elongated quartz tube 22, for example, having a gas inlet 23 at one end thereof and a gas outlet 24 at the other end. The quartz tube 22 also includes an opening or port 25 through which materials are placed into and removed from the furnace. Materials are placed on a holder 26 having a push rod 27 extending through one end of the furnace so that the holder and materials placed thereon may be introduced and removed from the furnace.

The furnace 21 is also provided with suitable heating elements, illustrated in FIG. 3 as electrical wires 28 which surround the quartz tube 22 in the region to be heated. The electrical wires 28 may, for example, be connected to a suitable current source, such as a 220-volt alternating current source. The electrical wires 28 may then be surrounded by suitable insulating material 29 to confine the heat generated by the electrical wires to the region within the quartz tube. Obviously those skilled in the art can appreciate that other heating means may also be employed, if desired, and that FIG. 3 is merely illustrative of one such heating means. The temperature of the furnace is detected by a suitable thermocouple 29 which extends through an opening in the quartz tube so that electrical connections can be made thereto. FIG. 3 also illustrates a metallic member 12 positioned on the holder 26 and a metallic member 13 overlying the member 12. These metallic members are introduced into the quartz tube through the opening 25 which is then sealed by suitable stopper means.

The quartz tube 22 is then purged with a reactive gas flow of approximately 4 cubic feet per hour of nitrogen and 0.02 cubic feet per hour of oxygen, for example. As used herein, reactive gas flow or atmosphere means a mixture of a gas such as argon, helium, or nitrogen, for example, with a controlled minor amount of a reactive gas, such as oxygen, or an oxygen-bearing gas, a phosphorus-containing gas such as phosphine, or a sulfur-containing gas such as hydrogen sulfide, for example. The amount of reactive gas in the total gas flow is dependent, in part, on the materials to be bonded, the thickness of the materials, and the gas flow rate, in a manner more fully described below. In general, however, the partial pressure of the reactive gas must exceed the equilibrium partial pressure of the reactive gas in the metal at or above the eutectic temperature. As pointed out above, when bonding copper members together, a reactive atmosphere including oxygen, for example, the partial pressure of oxygen must be in excess of $1.5 \times 10^{-6}$ atmospheres at the eutectic temperature of 1,065°C.

After purging the quartz tube, the furnace is then brought to a temperature sufficient to form a eutectic melt at the metal-to-metal interface. For example, for a copper-nickel bond with oxygen as the reactive gas, the temperature of the furnace is brought to approximately 1,072°C. At this temperature, a copper-copper oxide eutectic forms on the copper member and wets the copper member and the nickel member so that upon cooling, a tenacious bond is formed between the two metals.

In general, the times necessary to form this eutectic melt range between approximately 10 minutes for 1-mil-thick copper members and approximately 60 minutes for 250-mil-thick copper members, for example. For metallic members of other thicknesses and geometric configurations, the times required to form the eutectic melt vary. In general, the longer the metallic members are held at the eutectic temperature, the thicker the eutectic will be. The thickness of the eutectic also depends upon the partial pressure of the reacting gas. As pointed out previously, a partial pressure below the equilibrium partial pressure for the specific eutectic will result in no eutectic formation. Hence partial pressures in excess of this equilibrium value are required to produce the desired eutectic. If the partial pressure of the reacting gas is too high, however, all the metal reacts with the reactive gas and forms, for example, an oxide, sulfide, phosphide, etc. which prevents the formation of the eutectic melt. Thus, an intermediate reacting gas partial pressure is required so that both the eutectic melt phase and the metallic phase are present simultaneously. Tests have illustrated that extremely strong bonds are achieved when both phases are present. Accordingly, in practicing our invention the partial pressure of the reacting gas must be sufficiently great to permit the formation of a eutectic with the metal but not so great as to completely convert the metal to the oxide, sulfide, phosphide, etc. during the bonding time.

We have found that consistently good bonds are achieved between metallic members so long as the afore-mentioned conditions are met. However, no bonding occurs where the partial pressure of the reactive gas is less than the equilibrium partial pressure at the eutectic temperature and no bonding occurs where the partial pressure of the reactive gas is such that all the metallic member is converted to an oxide, phosphide, sulfide, etc.

Also, those skilled in the art can appreciate that the gas flow rate is not critical to the practice of our invention and may be varied over wide ranges without materially affecting the integrity of the bonds. However, economic considerations will generally control the acceptable gas flow rates. Further, the partial pressure of the reactive gas in the inert gas also can be varied, depending in part on the relative sizes of the materials to be bonded. The gas flow rate and the presence of reactive elements in the flow system, such as carbon susceptors, the presence of residual oxygen or water in the bonding system and the bonding time.

Table III illustrates useful ranges for partial pressures of reactive gases at which bonding occurs between selected metals in the presence of oxygen-bearing or sulfur-bearing gases. Only those eutectics which exhibit a eutectic temperature within 50° of the melting point of the metal are listed.

TABLE III

| EUTECTIC COMPOUND | % REACTIVE GAS BY VOLUME |
|---|---|
| Cu - CuO | 0.01–0.5 |
| Cu - CuS | 0.01–0.5 |
| Ni - NiO | 0.01–0.3 |
| Co - CoO | 0.01–0.4 |
| Fe - FeO | 0.01–0.3 |

It is to be understood that Table III illustrates, by way of example, selected metals and the percent of reactive gases in the total gas flow which are useful in practicing our invention. However, those skilled in the art can readily appreciate that other materials and other reactive gases and gas flows may be employed without departing from the spirit and scope of our invention. For example, useful bonds are formed with binary metallic compositions, such as copper-nickel, nickel-cobalt, copper-chromium, copper-cobalt, iron-nickel and beryllium-copper, in reactive atmospheres including oxygen-bearing gases. Also, ternary compositions of iron, nickel and cobalt also form useful bonds in a reactive atmosphere of oxygen. Additionally, useful bonds are formed with molybdenum or aluminum in a reactive atmosphere including silane. Accordingly, it is to be understood that Table III is merely a partial listing of eutectic compounds and that our invention is not limited solely to those eutectics set forth in Table III.

Those skilled in the art can readily appreciate that the formation of metal-to-metal bonds with a metal-gas eutectic provides an extremely useful capability in electrical and electronic systems. For example, metal-to-metal bonds may be used for interconnections, packaging of electronic components, formation of hermetic seals, electrical crossovers in integrated circuits, to mention only a few. These metal-to-metal bonds are formed without the use of compressive forces on the metal members and do not require the interdiffusion of metals to effect tenacious bonds. Additionally, although the metallic members are illustrated as sheets or plates, it is to be understood that other configurations may also be used in the practice of our invention. Still other changes and modifications will occur to those skilled in the art and hence, the appended claims are intended to cover all such changes and modifications as fall within the true spirit and scope of our invention.

What we claim as new and desire to secure by Letters Patent of the United States is:

1. A method of tenaciously bonding two metal members together, said method comprising:

placing one metal member in contact with another metal member, at least one of said metal members characterized by the formation of a metal-gas eutectic on at least one of its surfaces when heated in a reactive gas atmosphere;

heating said metal members in a reactive gas atmosphere to form said eutectic, said eutectic wetting the contacting surfaces of said members; and cooling said members to form a bond therebetween.

2. The method of claim 1 wherein at least one of said metal members is selected from the group consisting of copper, nickel, cobalt, iron, chromium, silver and aluminum.

3. The method of claim 1 wherein at least one of said metal members is copper and the eutectic which forms on at least one surface is copper-copper oxide.

4. The method of claim 1 wherein the reactive gas atmosphere includes a partial pressure of a reactive gas in excess of the equilibrium partial pressure of the reactive gas in at least one of the metal members at or above the eutectic temperature of said one metal member.

5. The method of claim 1 wherein at least one of said metal members is selected from the group consisting of alloys of copper-nickel, nickel-cobalt, copper-chromium, copper-cobalt, iron-nickel, and beryllium-copper.

6. The method of claim 1 wherein said reactive gas atmosphere includes a gas selected from the group consisting of argon, helium, and nitrogen and between approximately 0.01 and 0.5 percent by volume of a reactive gas selected from the group consisting of an oxygen-bearing gas, a sulfur-bearing gas, a phosphorus-bearing gas and a silicon-bearing gas.

* * * * *